Dec. 29, 1925.  1,567,938
W. M. GAMBILL
DENTAL ARTICULATOR
Filed Feb. 25, 1925   2 Sheets-Sheet 1

W. M. Gambill, INVENTOR.
BY
Geo. F. Kimmel, ATTORNEY.

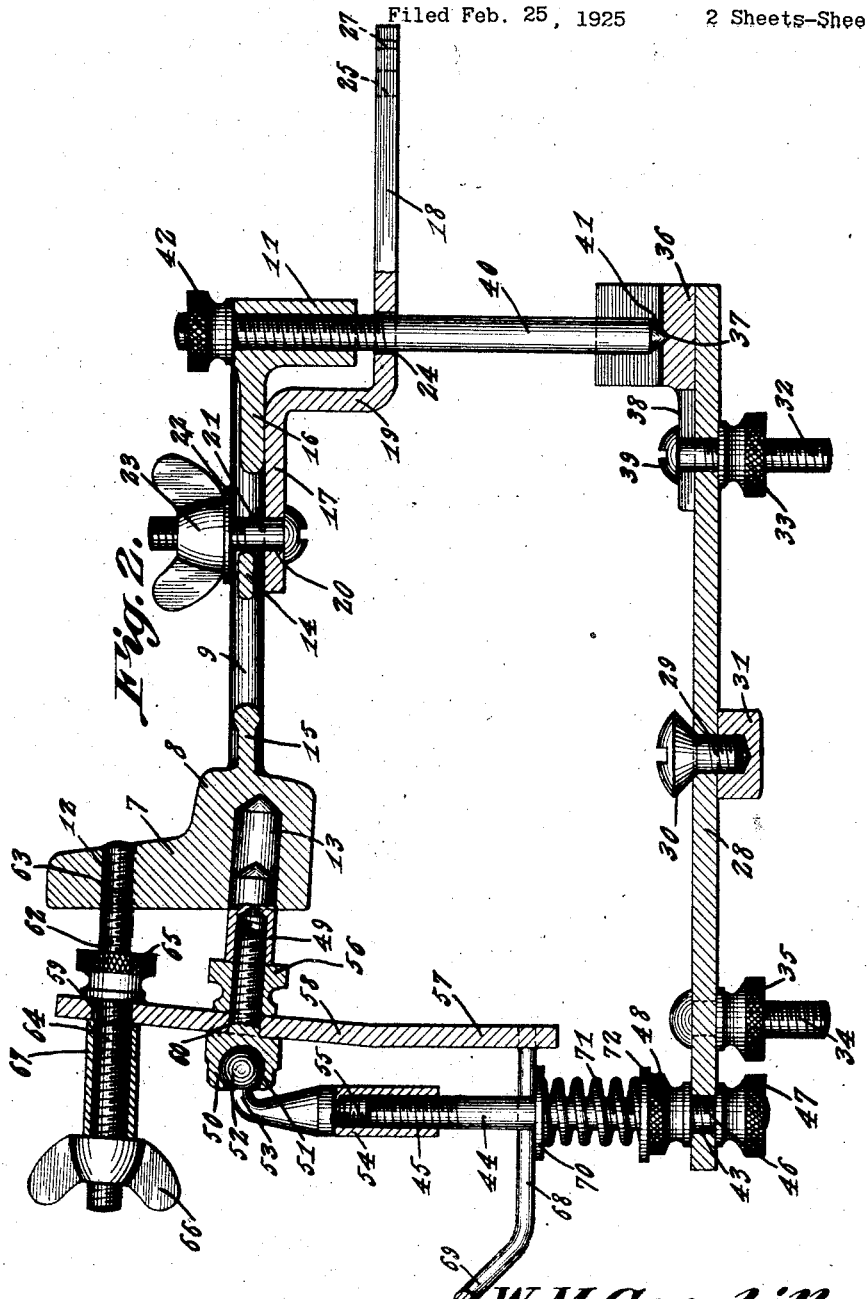

Patented Dec. 29, 1925.

1,567,938

UNITED STATES PATENT OFFICE.

WILLIAM M. GAMBILL, OF MERKEL, TEXAS.

DENTAL ARTICULATOR.

Application filed February 25, 1925. Serial No. 11,516.

*To all whom it may concern:*

Be it known that I, WILLIAM M. GAMBILL, a citizen of the United States, residing at Merkel, in the county of Taylor and State of Texas, have invented certain new and useful Improvements in Dental Articulators, of which the following is a specification.

This invention relates to a dental articulator, and has for its object to provide, in a manner as hereinafter set forth, an articulator of the class referred to, which when operated, will efficiently grind in the teeth to obtain a thoroughly satisfactory occlusion for producing and perfecting the three-point contact, the rotation point, the inward slant, the downward slant and the incisal slant on the occlusal surface of the teeth.

A further object of the invention is to provide, in a manner as hereinafter set forth, an articulator having means for preserving the depth of the cusp of the teeth when grinding in occlusion, and further to indicate the proper positioning for the medial line or central occlusion when setting up the teeth in a position to be operated on.

A further object of the invention is to provide, in a manner as hereinafter set forth, an articulator having means for adjustably positioning a retruded and a protruded bite therein.

Further objects of the invention are to provide, in a manner as hereinafter set forth, a dental articulator, which is simple in its construction and arrangement, strong, durable, adjustable, thoroughly efficient and convenient in its use, readily installed with respect to a driving attachment therefor, and comparatively inexpensive to manufacture.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications can be resorted to, which fall within the scope of the claims hereunto appended.

In the drawings wherein like reference characters indicate corresponding parts throughout the several views:

Figure 2, is a longitudinal sectional view of the articulator.

Figure 1:
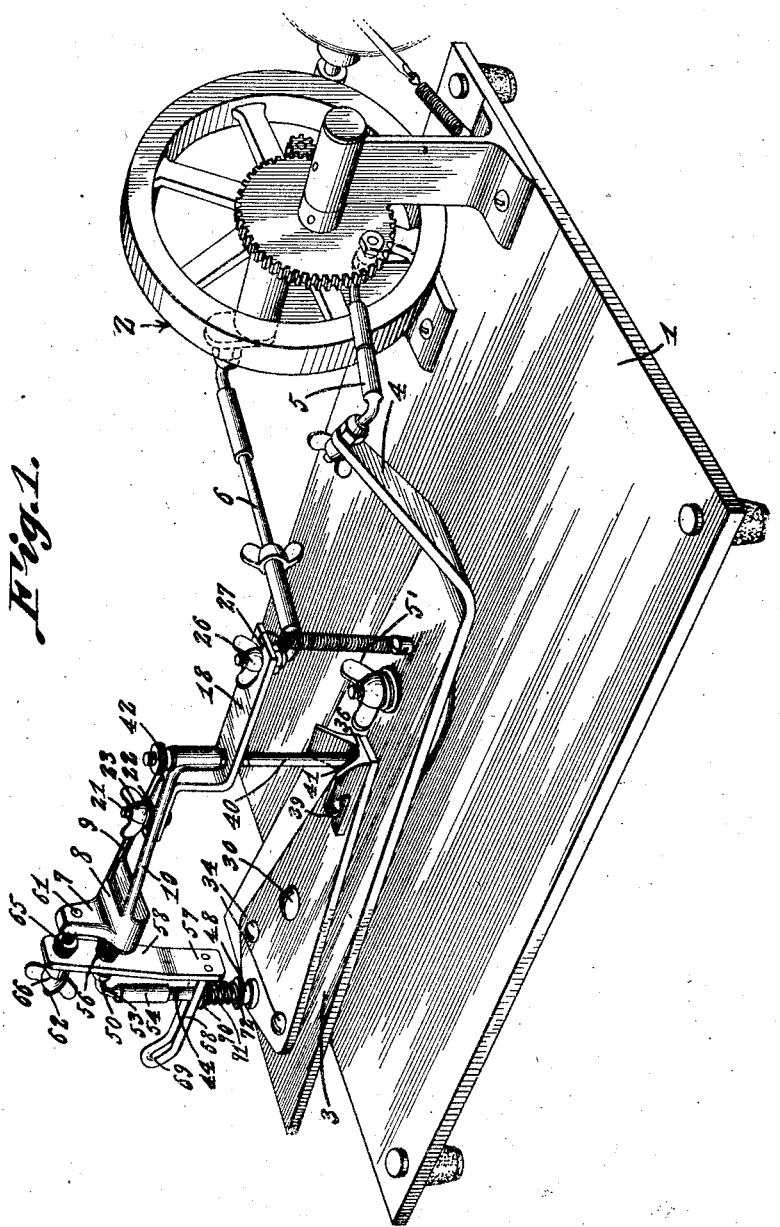
Figure 1, is a perspective view of a dental articulator in accordance with this invention showing the adaptation therewith of a driving attachment therefor.

A dental articulator, in accordance with this invention, can be operated by any suitable driving attachment, preferably by a driving attachment forming the subject matter of Letters Patent granted to me March 25, 1924, #1,488,335, and the articulator is illustrated as being operatively connected with the form of driving attachment as set forth in the Letters Patent aforesaid.

The base of such driving attachment is indicated at 1, and the driving attachment generally by the reference character 2. It is thought unnecessary to specifically describe the driving attachment 2 as an entirety and refer only to the following elements thereof.

The oscillatory base 3 formed with the up-standing angularly disposed inner terminal 4, the driving member 5 connected to the terminal portion 4, the driving member 6 connected to the upper articulator member and the spring 5 which connects the upper member to the oscillatory support 3 which is mounted over the base 1.

An articulator, in accordance with this invention, comprises an upper articulator member and a lower articulator member arranged in superposed relation, as well as being connected together, and the said articulator members are driven in opposite directions, relative to each other, through the medium of the driving members 5 and 6.

The upper articulator member comprises a vertically disposed triangular-shaped casting 7 formed at its lower end with a right angularly disposed inwardly directed extension 8 of substantial thickness and integral with said extension 8, at each side of the top thereof, is a pair of bars 9 and 10 which project inwardly from said extension and towards each other at an inclination, and the inner end of the bars 9, 10 terminate in a vertically disposed depending sleeve 11. The casting 7, near its top, is formed with an opening 12 and near its lower end, centrally thereof, with a socket 13 of a length to project into the extension 8. The bars 9, 10, intermediate their ends, have formed integral therewith a brace piece 14. The extension 8 is formed with a protuberance 15, which is integral with the inner sides of the bars 9, 10 and is spaced from the brace piece 14. The sleeve 11 has its upper end formed with an integral extension 16, which is arranged between and formed integral with the inner sides of the bars 9, 10 and is spaced from the brace piece 14.

Detachably connected with the upper articulator member is a coupling strip formed of a pair of end portions 17, 18 and an intermediate portion 19 which is disposed vertically and positioned outwardly with respect to the sleeve 11, as well as disposed in parallelism therewith and depending below the lower end thereof. The end portions 17 and 18 extend in parallel planes and the former is positioned against the extension 16 and formed with an opening 20 through which extends a connecting bolt 21. Mounted on the bolt 21 and seated on the bars 9 and 10 is a washer 22 and engaging with the bolt 21 is a clamping nut 23 of the wing type. The bolt 21 and nut 23 detachably clamps the coupling strip against the lower face of the upper articulator member. The portion 18 is arranged below the sleeve 11 and extends a substantial distance inwardly therefrom, and directly below the sleeve 11 the end portion 18 is formed with an opening 24 which is arranged in alignment with the opening formed by the sleeve, and said end portion 18 in proximity to its inner or free end is formed with an opening 25 for the passage of a coupling device 26 to connect the driving member 6 with the coupling strip. The end portion 18 is furthermore provided with an opening 27 for securing the upper end of the spring 5 therewith.

The lower articulator member consists of a triangular-shaped plate 28 provided intermediate its ends and at its longitudinal center with an opening 29 for the passage of a threaded stud 30 to hold the plaster firmly when mounting the lower cast. The stud 29 extends through the plate 28 and carries on its lower end an interiorly threaded cap member 31 for coupling the stud to the plate 28. Extending through the plate 28, near its inner end, is a threaded stud 32 carrying a clamping nut 33 and extending through the rear end of the plate 21, is a pair of spaced threaded studs 34, each carrying a clamping nut 35. The studs 32 and 34, and nuts 33 and 35, are provided for fixedly securing the lower articulator member upon the upper face of the support 3.

Arranged upon the plate 28, at the inner end thereof, is a vertically disposed V-shaped guide 36, provided centrally of its upper face with a cavity 37. The bottom of the guide 36 has projecting therefrom a pair of spaced lugs 38, which are seated on the upper face of the plate 28 and are overlapped by the head 39 of the stud 32, to hold the guide 36 stationary when the plate 28 is fixedly secured to the support 3. Threadedly engaging with the inner face of the sleeve 11 is a vertically disposed regulating pin 40, having a tapered lower end 49 which engages in the cavity 37. The pin 40 extends through the opening 24 in the coupling strip and projects above the sleeve 21 and carries a nut 42 for maintaining it in adjusted position. The pin 40, in connection with the guide 36, after the pin 40 has been adjusted, preserves the depth of the cusp of the teeth when grinding in the occlusion. The cavity 37, in connection with the lower tapered end 41, of the pin 40, indicates the proper position for the medial line or central occulsion when the teeth are arranged in position to be operated on.

The plate 28, at its outer end, is formed with an opening 43 through which extends the lower end of a tensioned coupling device between the upper and lower articulator members, and said device consists of a vertically disposed cylindrical rod 44 having its upper and lower portions threaded as at 45, 46, respectively. The lower end of the rod 44 is provided with a nut 47 which abuts against the lower face of the plate 28 and the threaded lower portion 46 of the rod 44 is furthermore provided with a nut 48 which, in connection with the nut 47, clamps the rod 44 to the plate 28. The nut 48 also provides a support for a tensioning means to be presently referred to.

Slidably mounted in the socket 13 is a headed bolt 49 which has an adjustable ball and socket joint connection with the rod 44. The bolt 49 extends at a downward inclination and the socket 13 extends in the same plane as the bolt 49. The ball and socket joint connection consists of the providing of the head 50, of the bolt 49, with a spherical socket 51 in which is mounted a globular member 52, integral with the angular upper end 53, of a socket connecting member 54 which is vertically disposed. The socket in the member 54 is indicated at 55, and the wall of said socket 55 is threaded and with which adjustably and threadably engages the threaded upper portion 45 of the rod 44. Mounted on the bolt 49 and abutting against the casting 7 is an adjustable threaded stop collar 56 which also abuts against an element of a tensioning means to be now referred to.

The tensioning means comprises an upstanding rectangular strip 57 of substantial width, thickness and length and is formed with an inwardly inclined upper portion 58 provided with a pair of superposed openings 59, 60. The bolt 49 extends through the opening 60 and the collar 56 abuts against the inclined portion 58 of the strip 57. Extending into the opening 12, in the casting 7, as well as threadedly engaging therewith, as at 63, is a bolt 62, which extends through the opening 59 and projects outwardly from the upper end of the strip 57, as well as being threaded exteriorly of the strip 57, as at 64. Mounted on the bolt 62 and interposed between the upper end of the strip 57 and the casting 7 is a threaded adjustable stop collar 65. Engaging with the threaded portion 64, of the bolt 62, is a thumb nut 66, and interposed between the latter and the upper end of the strip 57, as well as mounted on the bolt 62, is a sleeve 67. The head of the bolt 49 bears against the inclined portion 58 of the strip 57.

Connected to the lower end of the strip 57, and projecting outwardly therefrom is a yoke 68 having an upwardly inclined outer portion 69. The yoke 68 straddles the rod 44 and is seated on a washer 70, carried by the rod 44 and supported by a coiled tension spring 71, which is also mounted on the rod 44 and seated on a washer 72, which surrounds the rod 44 and is mounted on the nut 48 and the latter provides means for increasing or decreasing the tension of the spring 71.

The bolt 49, collar 56, bolt 62, collar 65, nut 64 and sleeve 67 provide means for adjustably positioning a retruded and protruded bite in the articulator. The upper articulator member is adapted to have the upper cast attached thereto. The spring 71 keeps the articulator closed and exerts pressure when grinding the teeth.

The ball and socket joint enables free movement of the parts. The yoke 68 forms a guide for the rod 44 and the inclined outer end thereof forms a catch or lock to permit of the articulator to stand open when desired.

It is thought the many advantages of an articulator, in accordance with this invention can be readily understood, and although the preferred embodiment of the invention is as illustrated and described, yet changes in the details of the construction can be had which will fall within the scope of the invention as claimed.

What I claim is:—

1. An articulator comprising an upper articulator member provided with a socket at its outer end, a lower articulator member, a tensioned coupling device extending through the outer end of said lower member and slidably engaging in said socket, and an adjustable tensioning device connected with said upper member and slidably connected to said coupling device.

2. An articulator comprising an upper articulator member provided with a socket at its outer end, a lower articulator member, a tensioned coupling device extending through the outer end of said lower member and slidably engaging in said socket, an adjustable tensioning device connected with said upper member and slidably connected to said coupling device, and said coupling device including a ball and socket joint intermediate its ends.

3. An articulator comprising an upper articulator member provided with a socket at its outer end, a lower articulator member, an angle-shaped lengthwise adjustable coupling device extending through the outer end of said lower member and slidably engaging in said socket, and an adjustable tensioning device adjustably connected with said upper member and slidably connected to said coupling device.

4. An articulator comprising an upper articulator member provided with an opening and a socket at its outer end, said socket arranged below said opening, a lower articulator member, a coupling device detachably connected to said lower member and slidably engaging in said socket, and an adjustable tensioning device slidably mounted on said coupling device and extending into said opening and threadedly engaging with said upper articulator member.

5. An articulator comprising an upper articulator member provided with an opening and a socket at its outer end, said socket arranged below said opening, a lower articulator member, a coupling device detachably connected to said lower member and slidably engaging in said socket, and an adjustable tensioning device slidably mounted on said coupling device and extending into said opening and threadedly engaging with said upper articulator member, said coupling device provided with a ball and socket joint intermediate its ends.

6. An articulator comprising an upper articulator member provided with a socket and an opening at its outer end, said opening arranged over said socket, a lower articulator member, means carried at the inner end of the upper articulator member for detachably engaging in the inner end of the lower articulator member for preserving the depth of the cusp of the teeth when grinding in occlusion, a coupling device fixed to said lower member and slidably engaging in said socket, and a tensioning device mounted on said coupling device and extending into said opening and threadedly engaging with said upper member.

7. An articulator comprising an upper and a lower articulator member, said upper member provided with an opening and a socket, an up-standing strip, a vertically disposed rod connected to said lower member, a bolt extending through said strip and slidably engaging in said socket, a connecting member threadedly engaging with said rod, said connecting member and bolt having a ball and socket joint therebetween, a spring mounted on the bolt, a yoke mounted on the spring and connected to the lower end of said strip, a threaded element extending through said strip and into said opening and threadedly engaging with said upper member, and means mounted on said threaded element for adjusting the position of said strip.

8. An articulator comprising oscillatory upper and lower articulator members, an adjustable coupling device secured to the lower member and slidably engaging in the upper member, a tensioning device adjustably connected to the upper member and slidably mounted on said coupling device, and said tensioning device provided with means for detachably securing the articulator members in open position.

9. An articulator comprising oscillatory upper and lower articulator members, a coupling device secured to the outer end of the lower member and slidably engaging in the upper member at the outer end thereof, an adjustable tensioning device detachably secured to the upper member and slidably mounted on said coupling device, a vertically disposed pin adjustably connected to the inner end of the upper member, and a vertically disposed V-shaped guide carried by the lower member at the inner end thereof and having said pin extend therein.

10. An articulator comprising oscillatory upper and lower articulator members, a coupling device secured to the outer end of the lower member and slidably engaging in the upper member at the outer end thereof, an adjustable tensioning device detachably secured to the upper member and slidably mounted on said coupling device, a vertically disposed pin adjustably connected to the inner end of the upper member, and a vertically disposed V-shaped guide carried by the lower member at the inner end thereof and having said pin extend therein, said coupling device including means for detachably securing the articulator members in open position.

In testimony whereof, I affix my signature hereto.

WILLIAM M. GAMBILL.